Dec. 3, 1929.  H. M. HARRIS  1,737,793
HYDRAULIC SWIVEL
Filed Jan. 19, 1923   2 Sheets-Sheet 1
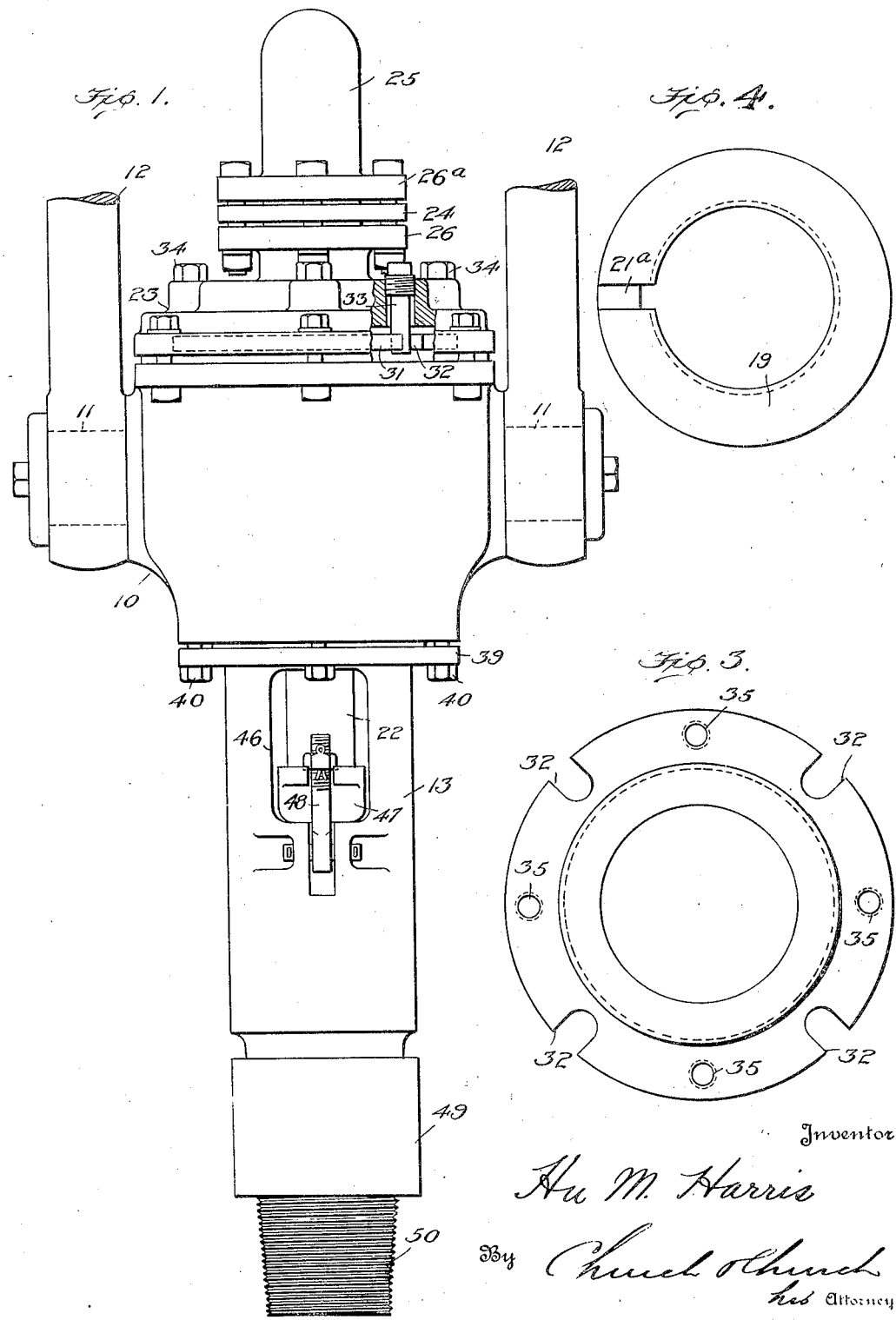

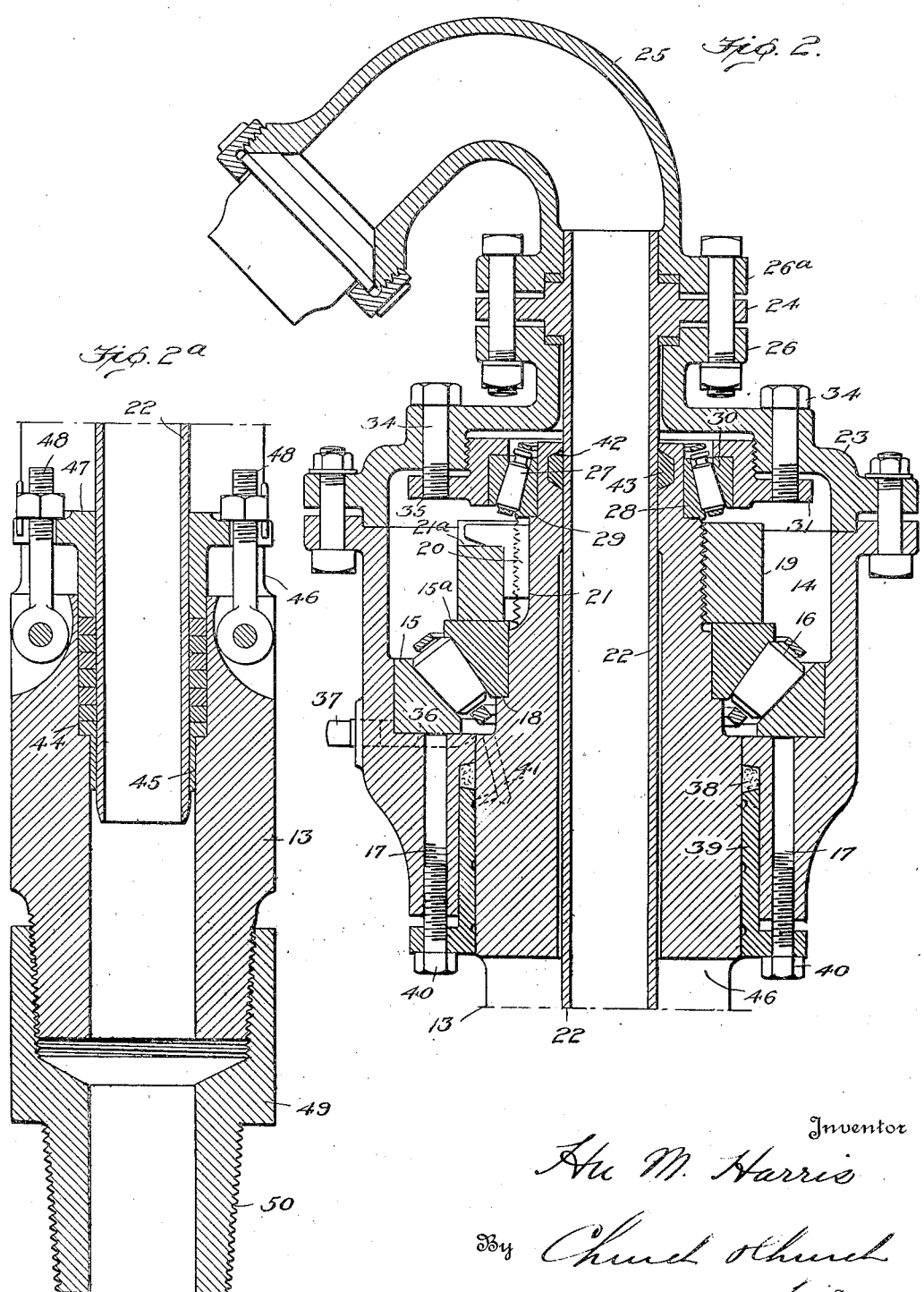

Patented Dec. 3, 1929

1,737,793

UNITED STATES PATENT OFFICE

HU M. HARRIS, OF CHATTANOOGA, TENNESSEE, ASSIGNOR TO LUCEY MANUFACTURING CORPORATION, OF CHATTANOOGA, TENNESSEE, A CORPORATION OF TENNESSEE

HYDRAULIC SWIVEL

Application filed January 19, 1923. Serial No. 613,710.

This invention relates to improvements in oil and gas well drilling apparatus and more particularly to what is commonly and commercially known as a hydraulic swivel, a type of swivel generally used in connection with rotary drilling apparatus where a mud ladened fluid is conducted under pressure from a point of supply above the ground surface downwardly through the rotating drill stem and discharged at the drill bit secured upon the lower end of the drill stem in the bottom of the well being bored.

In this mud ladened fluid system of drilling the swivel stem is journaled in a lubricant filled chamber in a trunnion block and, as is well known, there is generally used a conducting pipe for the fluid that extends through the trunnion block and swivel stem and communicates at its lower end with the usual drill stem which is connected to the swivel stem. The fluid conducting pipe is generally stationary while the swivel stem, together with the connected string of casing, revolves on the bearings in the trunnion block. There has formerly been proposed various arrangements for packing the swivel against loss of lubricant from the chamber in the block and to prevent the ingress of mud ladened fluid between the relatively moving parts and an object of the present invention is to devise an arrangement of packing that will not only be efficient but will reduce the cost of maintenance of the tool. More specifically, the invention contemplates the provision of a packing arrangement wherein the packing is arranged in parts that are subjected to very little wear and, as a consequence, these parts, which are produced at a comparatively large cost, due to the provisions made therein for the packing, etc., do not need to be replaced with any great frequency, resulting in an appreciable saving in the up-keep of the swivel.

Other objects of the invention are to provide a combined radial and thrust bearing for the swivel stem in addition to the main radial bearing of the stem, and to provide means for adjusting said radical and thrust bearing with respect to the stem. Additionally, means are provided for locking the thrust bearing in any of its adjusted positions after which any looseness in the bearing may be taken up. The combined radial and thrust bearing also prevents the loss of the locking means of the main bearing.

A further object is to provide a swivel in which the parts mounted in the lubricant chamber of the trunnion block can be removed from the block as a unit and in connection with this phase of the invention means are provided for facilitating the removal of the main bearing plate of the stem from said chamber.

In the accompanying drawings—

Figure 1 is an elevational view of a hydraulic swivel illustrating the preferred embodiment of this invention;

Fig. 2 is a sectional view taken at right angles to Fig. 1;

Fig. 2ª is a similar view of the lower portion of the swivel.

Fig. 3 is a detail view of a portion of the combined radial and thrust bearing; and Fig. 4 is a detail view of the lock nut for locking the main radial bearing of the stem in place.

In accordance with usual practice the trunnion block 10 of the swivel is provided with opposed trunnions 11 to which bails 12 are attached for suspending the swivel in the derrick by suitable suspension means, not shown. The block 10 is formed with a central bore in its lower portion for the swivel stem 13 and this central bore merges at its upper end in a lubricant chamber 14 in which the bearings for stem 13 are located, said bearings in actual use beng practically submerged in a bath of lubricant contained in said chamber 14.

The main radial bearing for stem 13 consists of an annular bearing plate 15 that rests on the bottom of lubricant chamber 14 around the central bore and a second bearing plate 15ª on the swivel stem, suitable anti-friction elements 16 being interposed between the two plates. Plate 15 makes a close fit with the side walls of chamber 14 and has to be pressed into its place in the chamber. This will retain the plate in the block and it can best be removed by providing means whereby it can be engaged on its bottom face. A convenient arrangement for securing this result is the provision of apertures 17 extending upwardly through block 10, the apertures being of sufficient size to permit a tool to be inserted against the bottom face of the plate.

The other bearing plate 15ᵃ is preferably secured on the stem 13 between an abutment 18 on the stem and a nut 19 removably secured on the stem, said nut in effect forming the swivel stem head. To prevent accidental displacement or loosening of nut 19 it is locked on the stem by a key 20 which engages in a key way 21 in the stem and a slot 21ᵃ in the top face of the nut. Although the key may readily be placed in the slots in the stem and nut after these parts have been assembled, it can not work out while the swivel is in use because the slots are practically closed by the thrust bearing hereinafter described.

The swivel stem 13 terminates within chamber 14 a short distance above nut 19 but the fluid conducting pipe 22 for conveying the mud ladened fluid through the stem projects upwardly through a central aperture in the block cover 23 which is secured on the block by suitable fastening means, such as bolts, and encloses the lubricant chamber and the working parts in the chamber. At its upper protruding end fluid pipe 22 has an annular flange 24 and is connected to a goose neck 25 by bolts passing through said flange and similar flanges 26, 26ᵃ on the cover and goose neck.

Serving primarily as a hold down or thrust bearing but also as a radial bearing, a second anti-friction bearing is provided in chamber 14 adjacent the upper end of stem 13. This combined radial and thrust bearing preferably consists of a series of anti-friction elements, such as roller bearings 27, located between a raceway or bearing plate 28 mounted against an abutment 29 on stem 13 and a second raceway or bearing plate 30 carried by cover 23 and a convenient and efficient arrangement of these parts is as follows: Raceway 30 is mounted in an annular plate 31 screw threaded on said cover 23 whereby said raceway may be raised or lowered in chamber 14 to adjust it with respect to the raceway 28 on the stem as well as with respect to the main bearing at the bottom of chamber 14. By screwing plate 31 in one direction any looseness in either of the bearings will be taken up while rotation of said plate in the opposite direction will ease up on both of said bearings. Suitable means are provided for locking said plate 31 in any of its adjusted positions, such locking means preferably taking the form of a series of recesses 32 in plate 31 adapted to be engaged by a plug 33 extending down through cover 23. As there is always a certain amount of looseness in a connection such as that between plate 31 and cover 23, there is provided a series of screw threaded bolts 34 extending down through cover 23 and engaging in screw threaded sockets 35 in plate 31 for taking up any looseness between said parts in excess of the clearance necessary for the proper functioning of the anti-friction elements. In any of its positions the raceway 28 is always sufficiently close to nut 19 on stem 13 to act as a guard to prevent the escape of the locking key 20 from the slots in the stem and nut.

The apertures in the cover for said bolts 34 and for the locking plug 33, but preferably the latter, may be utilized for filling the chamber 14 with lubricant while an outlet opening 36 at the bottom of the chamber, normally closed by a plug 37, is used for drawing off the lubricant when desired. The waste or escape of lubricant down between the swivel stem and the walls of the central bore in block 10 is prevented by suitable packing 38 held in a recess between said parts by a gland 39 which is adjustable by screws 40 working in recesses 17 in the block. A small quantity of lubricant is supplied from chamber 14 through a duct 41 in block 10 to the wearing surfaces of gland 39 and the stem 13. As is understood, there is a clearance between the stem 13, which is rotated, and the fluid conducting pipe 22, which remains stationary, and to prevent escape of lubricant from chamber 14 down through this space, a packing recess 42, with a washer 43 therein, is formed in the inner face of the cylindrical extension with which stem 13 is provided for accommodating the thrust bearing plate 28.

At the lower extremities of stem 13 and fluid pipe 22, suitable packing is provided between these two members in a recess 44 formed in the stem for that purpose immediately above a bushing 45 which is placed between the stem and pipe to provide a wearing surface for said pipe. This packing prevents water and the foreign matter carried thereby passing up between the stem and pipe where it would do considerable harm. Adjacent this packing, however, and a little above it, the stem is formed with a plurality of ports or openings 46 and should any water succeed in passing the packing 44, due to wear of the latter, it would escape laterally through said ports or openings. Suitable glands 47 are provided for maintaining the packing 44 under compression and for convenience in manipulating said glands and for rendering the glands and packing readily accessible should the removal of either be desired, the ports or openings 46 in the stem 13 are made comparatively large with the glands extending from between the stem and pipe into said openings where they are adjustably secured as by threaded bolts 48 carried on the stem 13 and working in screw threaded apertures in the glands.

This gland and packing arrangement being on the stem 13 it is preferred that the attachment of the swivel and drill casing be accomplished in such wise as to protect the stem against wear, some comparatively inexpensive coupling means being used and thus eliminating the necessity of renewing the more or less expensive stem. This is preferably accomplished by providing the stem 13 at its lower end with a solid coupling 49 formed with the usual interior screw threads for attachment to the stem and with the exterior threads 50 for attachment to the drill stem. The frequent connections and disconnections of the successive sections of drill casing to the swivel are then made by attaching them to the coupling instead of directly to the stem 13. All the wear is thus on the coupling whose cost of production is comparatively low and whose replacement entails little expense.

The diameter of stem 13 does not, at any point throughout its length, exceed the diameter of the central bore in block 10 and in disassembling the swivel can be drawn upwardly through the trunnion block, the coupling 49 remaining on the stem as it is of the same size as the stem. It is also unnecessary to remove all of the bearing plates in disassembling as these may be removed with the stem as a unit. This is advantageous as it not only permits of quick removal of the stem but it also eliminates the detachment of numerous small parts which are apt to become lost.

What is claimed is:

1. In a hydraulic swivel, the combination of the trunnion block, a bearing plate mounted therein, a series of anti-friction elements on said plate, a swivel stem, spaced shoulders on the stem, a bearing plate on the stem between the shoulders, one of said shoulders being detachable to permit removal of said plate from the stem, means for locking said shoulder on the stem, said locking means comprising a key adapted to be inserted in slots in the stem and shoulder, and a thrust bearing for the stem, said thrust bearing closing said slots in the stem when the swivel is assembled.

2. In a hydraulic swivel, the combination of the trunnion block having a lubricant chamber therein, a cover, a swivel stem having one end journaled in said block, said end being reduced in cross section to form spaced abutments on said stem, a radial bearing raceway secured against one of said abutments, a thrust bearing raceway seated against the other abutment, and a second thrust bearing raceway secured to the cover and adjustable with respect to the other raceways.

3. In a hydraulic swivel, the combination of a trunnion block having a lubricant chamber therein, a swivel stem journaled in the chamber, a cover for the chamber, a thrust bearing for the stem comprising a raceway carried by the stem, an annular plate having a series of openings therein carried by the cover, a raceway secured to the plate, said plate being adjustable on the cover to adjust the raceway carried thereby, and means in the cover engageable with the openings in the plate for locking it in adjusted position.

4. In a hydraulic swivel, the combination of a trunnion block having a lubricant chamber therein, a swivel stem journaled in the chamber, a cover for the chamber, a thrust bearing for the stem comprising a raceway on the stem, an annular plate having a series of openings therein, a raceway carried by the plate, said plate being adjustable on the cover, means for locking the plate in adjusted position, and a series of bolts extending through the cover and plate for clamping it against the cover.

5. In a hydraulic swivel, the combination of a trunnion block having a lubricant chamber therein, a swivel stem journaled in the lubricant chamber, bearing plates for the stem, one of said plates being located in the bottom of said lubricant chamber, there being an opening in the trunnion block for facilitating removal of said plate from the chamber and said opening being closed at its upper end by said lower bearing plate.

6. A swivel device comprising in combination a hollow head, a shackle or bail pivotally connected with opposite sides of said head, a rotatable stem centrally located in said head, two sets of anti-friction bearings located one above the other and interposed between said head and stem, each set comprising a plurality of tapered rollers with the larger ends of the rollers of one set uppermost and the larger ends of the rollers of the other set lowermost, and means for simultaneously adjusting a member of each of said sets of bearings.

7. A swivel device comprising in combination a hollow head, a shackle or bail pivotally connected with opposite sides of said head, a rotatable stem centrally located in said head, two sets of anti-friction bearings located one above the other and interposed between said head and stem, each set comprising inner and outer annular members and a plurality of tapered rollers interposed between said members, the larger ends of the rollers of one set being uppermost and the larger ends of the rollers of the other set being lowermost, and means for simultaneously adjusting a member of each of said sets of bearings.

8. A swivel device comprising in combination a hollow head, a shackle or bail pivotally connected with opposite sides of said head, a rotatable stem centrally located in said head, two sets of anti-friction bearings located one above the other and interposed between said head and stem, each set comprising inner and outer annular members and a plurality of tapered rollers interposed between said members, the larger ends of the rollers of the lower set being uppermost and the larger ends of the rollers of the upper set being lowermost, and means for simultaneously adjusting a member of each of said sets of bearings.

HU M. HARRIS.